(12) United States Patent
Bhyat et al.

(10) Patent No.: US 11,044,545 B1
(45) Date of Patent: Jun. 22, 2021

(54) HEADPHONES RESTRICTED TO USE WITH A PARTICULAR CONTROLLED-ENVIRONMENT FACILITY RESIDENT COMMUNICATION AND/OR MEDIA DEVICE

(71) Applicant: Securus Technologies, Inc., Carrollton, TX (US)

(72) Inventors: Zain Bhyat, Plano, TX (US); Adam Christopher Edwards, Fort Worth, TX (US); Hezi Ben Moshe, Aventura, FL (US); Scott Passe, Forney, TX (US)

(73) Assignee: Securus Technologies, LLC, Carrollton, TX (US)

( * ) Notice: Subject to any disclaimer, the term of this patent is extended or adjusted under 35 U.S.C. 154(b) by 0 days.

(21) Appl. No.: 16/740,771

(22) Filed: Jan. 13, 2020

(51) Int. Cl.
| | |
|---|---|
| H04R 1/10 | (2006.01) |
| H04W 24/08 | (2009.01) |
| H04R 1/08 | (2006.01) |
| G08B 3/10 | (2006.01) |
| G06F 3/16 | (2006.01) |
| H04W 24/10 | (2009.01) |

(52) U.S. Cl.
CPC ........... *H04R 1/1041* (2013.01); *G06F 3/165* (2013.01); *G08B 3/10* (2013.01); *H04R 1/08* (2013.01); *H04W 24/08* (2013.01); *H04R 2420/07* (2013.01); *H04W 24/10* (2013.01)

(58) Field of Classification Search
None
See application file for complete search history.

(56) References Cited

U.S. PATENT DOCUMENTS

| 10,531,197 | B1* | 1/2020 | Morales | H04R 3/00 |
|---|---|---|---|---|
| 2008/0013601 | A1* | 1/2008 | Lind | H04W 12/003 |
| | | | | 375/140 |
| 2009/0055525 | A1* | 2/2009 | Slepov | H04L 41/0803 |
| | | | | 709/224 |
| 2010/0105331 | A1* | 4/2010 | Buehler | H04B 5/02 |
| | | | | 455/41.3 |
| 2010/0159833 | A1* | 6/2010 | Lewis | H04B 17/23 |
| | | | | 455/41.3 |

(Continued)

OTHER PUBLICATIONS

HelloTech, "How to connect bluetooth headphones to any device." pp. 1-18. Published Jan. 2, 2020. https://www.hellotech.com/guide/for/how-to-connect-bluetooth-headphones-pc-mac-iphone-android-phone (Year: 2020).*

*Primary Examiner* — Qin Zhu
(74) *Attorney, Agent, or Firm* — Fogarty LLP

(57) ABSTRACT

In systems and methods that restrict a set of wireless headphones to use with a particular controlled-environment facility resident communication and/or media device, a controlled-environment facility resident communication and/or media device disposed within a controlled-environment facility wirelessly communicatively links a set of wireless headphones with the controlled-environment facility resident communication and/or media device. The controlled-environment facility resident communication and/or media device dedicates the set of wireless headphones to the controlled-environment facility resident communication and/or media device by restricting the set of wireless headphones to use with the controlled-environment facility resident communication and/or media device.

21 Claims, 3 Drawing Sheets

(56) References Cited

U.S. PATENT DOCUMENTS

| | | | | |
|---|---|---|---|---|
| 2011/0286615 | A1* | 11/2011 | Olodort | H04R 1/1025 |
| | | | | 381/311 |
| 2012/0257583 | A1* | 10/2012 | Keiser | H04W 4/80 |
| | | | | 370/329 |
| 2015/0319518 | A1* | 11/2015 | Wilson | H04R 1/10 |
| | | | | 381/71.6 |
| 2018/0130321 | A1* | 5/2018 | Brayton | H04W 88/085 |

* cited by examiner

HEADPHONES RESTRICTED TO USE WITH A PARTICULAR CONTROLLED-ENVIRONMENT FACILITY RESIDENT COMMUNICATION AND/OR MEDIA DEVICE

TECHNICAL FIELD

The present disclosure relates generally to media and/or communications devices adapted for use by residents of a controlled-environment facility, and more particularly to headphones dedicated to (i.e., restricted to use with) a particular controlled-environment facility resident communication and/or media device.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. Traditional methods for dissemination of education or entertainment media in controlled-environment facilities have included print libraries, or the like. However, during his or her incarceration, an inmate may be afforded opportunities to communicate with the outside world and/or consume audio and/or video content. Traditionally, jails and prisons have allowed inmates to contact friends and family via letters and telephone calls. More recently, jails and prisons have begun to allow inmates to use portable electronic devices, such as tablet computing devices, smartphones, or the like, to facilitate contact with friends and family and/or for entertainment and education.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide wireless headphones restricted to use with a particular controlled-environment facility resident communication and/or media device. Therein, a controlled-environment facility resident communication and/or media device disposed within a controlled-environment facility wirelessly communicatively links a set of wireless headphones, which may include a microphone, with the particular controlled-environment facility resident communication and/or media device. The controlled-environment facility resident communication and/or media device dedicates the set of wireless headphones to the controlled-environment facility resident communication and/or media device by restricting the set of wireless headphones to use with the controlled-environment facility resident communication and/or media device. This restriction of the set of wireless headphones to use with the controlled-environment facility resident communication and/or media device may employ serialization of the set of wireless headphones using serial numbers of the set of wireless headphones and the controlled-environment facility resident communication and/or media device, during linkage of the set of wireless headphones with the controlled-environment facility resident communication and/or media device.

According to some aspects of the present systems and methods, the respective controlled-environment facility resident communication and/or media device may have a (persistent) wireless headphones application program (app) installed and running thereon, configuring the respective controlled-environment facility resident communication and/or media device to wirelessly communicatively link the respective set of wireless headphones with the respective controlled-environment facility resident communication and/or media device and dedicate the respective set of wireless headphones to the respective controlled-environment facility resident communication and/or media device by restricting use of the set of wireless headphones to use with the controlled-environment facility resident communication and/or media device.

According to some (other) aspects of the present systems and methods, an operating system of the respective controlled-environment facility resident communication and/or media device may configure the respective controlled-environment facility resident communication and/or media device to wirelessly communicatively link the respective set of wireless headphones with the respective controlled-environment facility resident communication and/or media device and dedicate the respective set of wireless headphones to the respective controlled-environment facility resident communication and/or media device by restricting use of the set of wireless headphones to use with the controlled-environment facility resident communication and/or media device.

According to further aspects of the present systems and methods, the respective controlled-environment facility resident communication and/or media device, or the respective headphones themselves, may interrupt play of media over the respective set of wireless headphones, in response to receipt of a notification (wirelessly) transmitted by the controlled-environment facility, within the controlled-environment facility and play the notification over the respective set of wireless headphones. The controlled-environment facility may also be enabled to configure the respective controlled-environment facility resident communication and/or media device and the respective set of wireless headphones, remotely, and/or enabled to monitor communication between the respective controlled-environment facility resident communication and/or media device and the respective set of wireless headphones, remotely.

According to other aspects of the present systems and methods, the respective controlled-environment facility resident communication and/or media device and/or respective headphones may detect short-range wireless signals not associated with the respective controlled-environment facility resident communication and/or media device and/or the respective set of wireless headphones and generate an alert to the controlled-environment facility as to a location of, and/or transmit to the controlled-environment facility, the detected short-range wireless signals.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
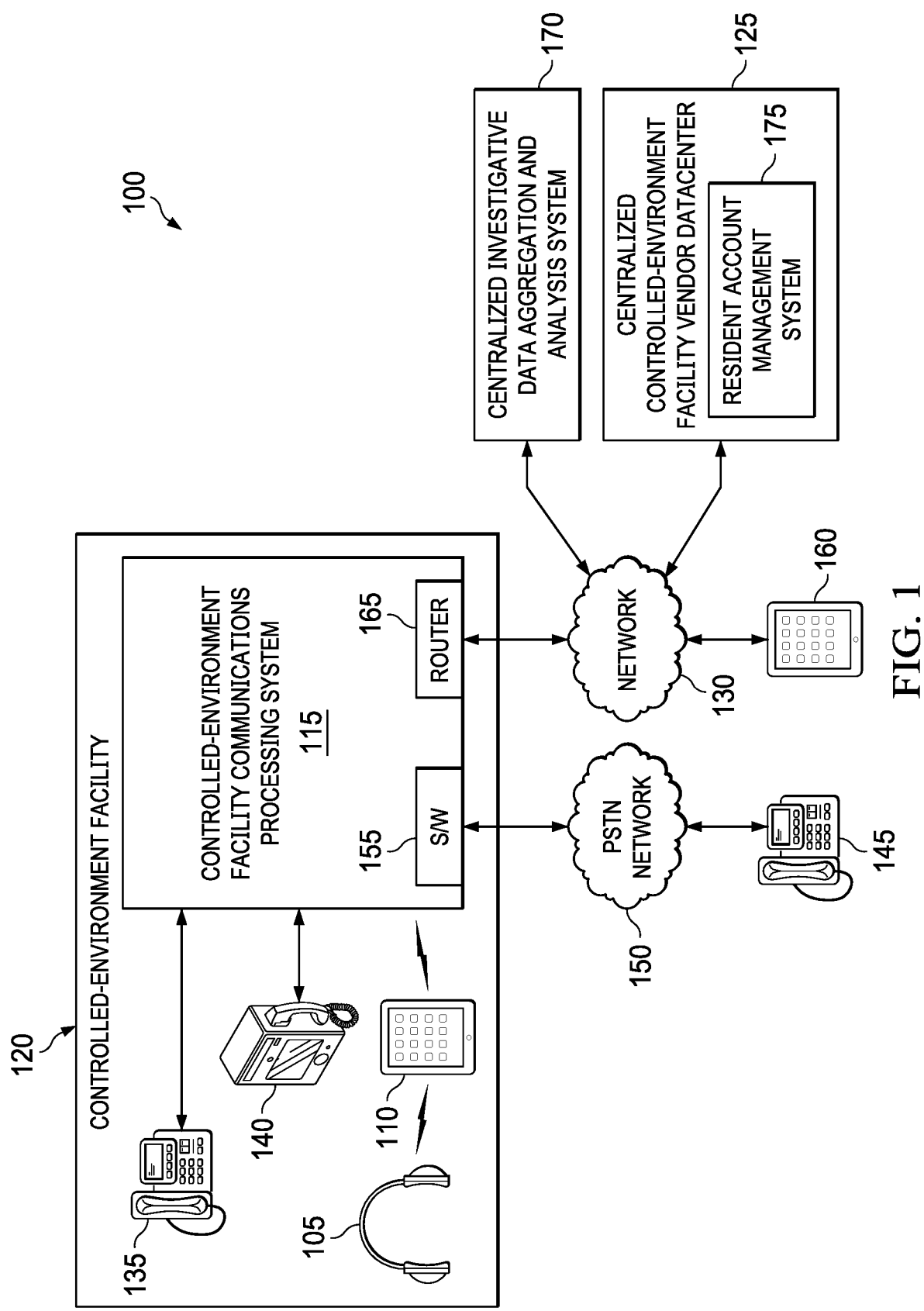
Figure 2:
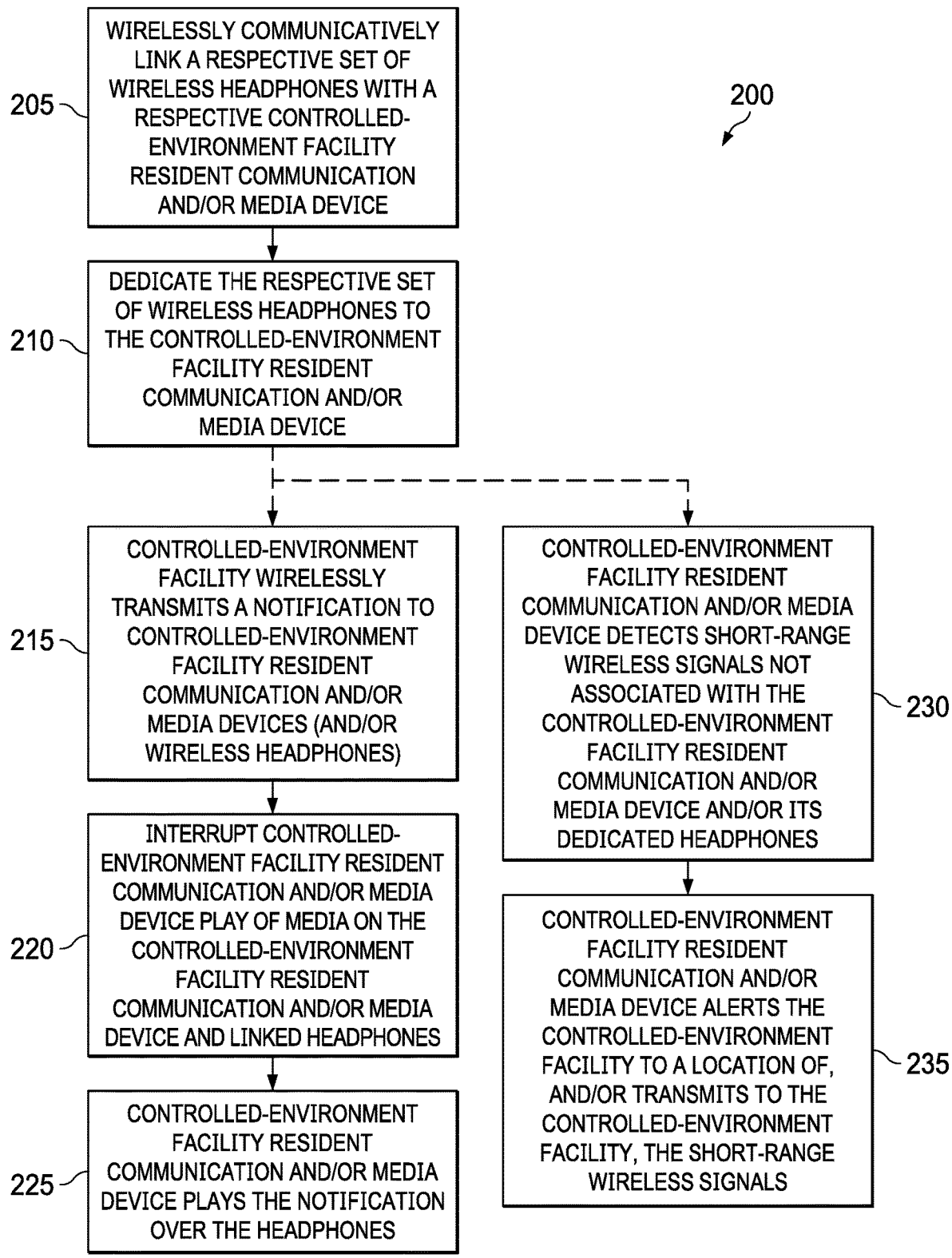
Figure 3:
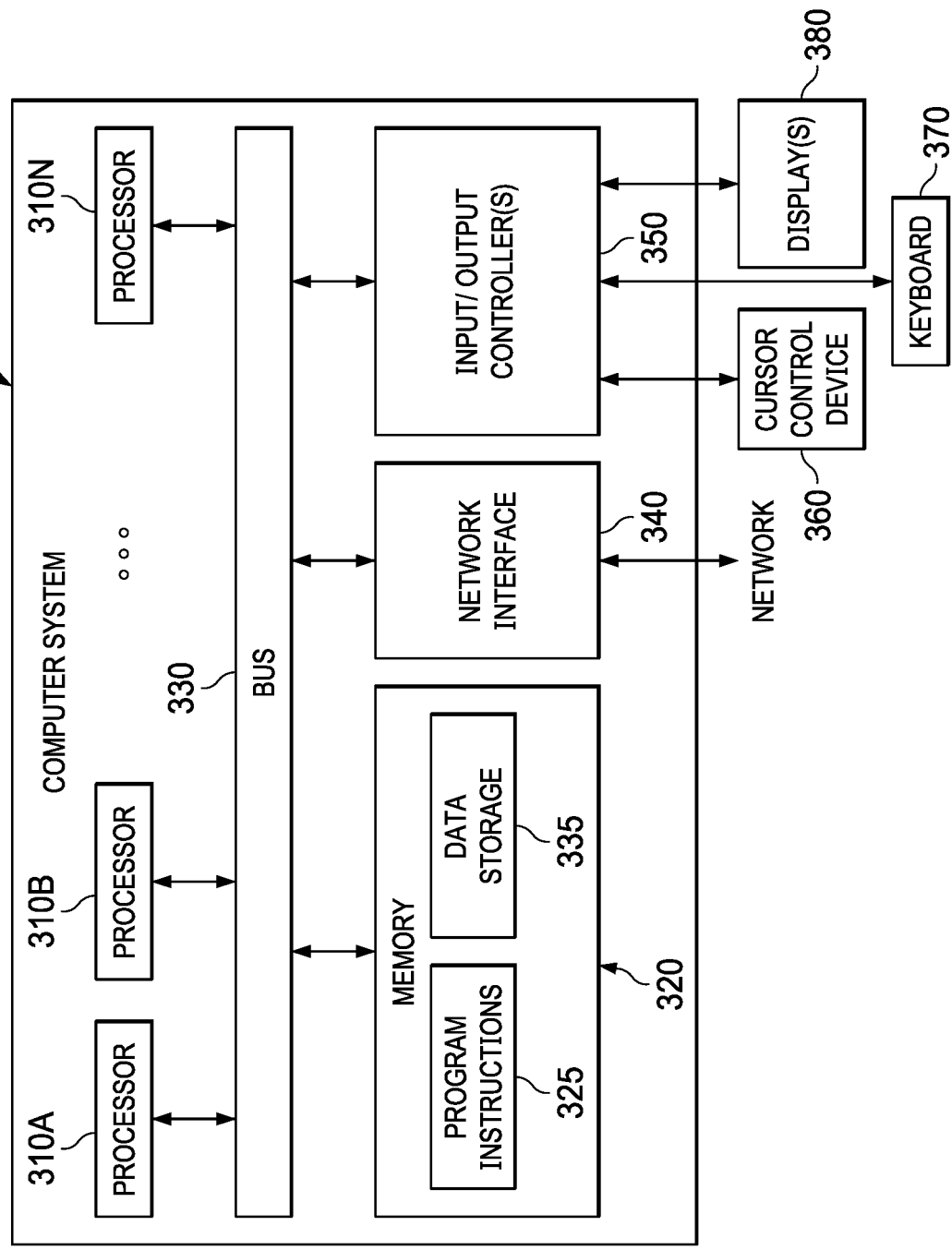

Having thus described the invention in general terms, reference will now be made to the accompanying drawings, which are not necessarily drawn to scale, and wherein:

FIG. 1 is a diagrammatic illustration of an example controlled-environment, wherein an example embodiment of the present headphones restricted to use with (dedicated to) a particular controlled-environment facility resident communication and/or media device may be employed while in a controlled environment facility, in accordance with some embodiments;

FIG. 2 is a flowchart of an example process for dedicating a set of headphones for use restricted to a particular controlled-environment facility resident communication and/or media device, in accordance with some embodiments;

FIG. 3 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, common carrier vehicles and their passages, etc.).

Embodiments of the present systems and methods relate generally to media and/or communications devices adapted for use by residents of a controlled-environment facility. However, it is not desirable to provide residents such as inmates of correctional facilities corded headphones, ear buds, or the like, since these cords might be used as weapons, vandalized and/or otherwise misused. Hence, the present systems and methods relate specifically to headphones dedicated to (i.e., restricted to use with) a particular controlled-environment facility resident communication and/or media device. As used herein, the term "headphones" refers to: over the ear, on the ear headphones, etc. having speaker earcups, or the like, and a head band, neck band, or the like connecting the ear cups; earphones, earbuds, or the like, which may be connected by a cord extending between them, or not; a personal (powered) speaker; and/or other devices for listening to media played by media and/or communications devices, or the like.

In accordance with embodiments of the present systems and methods, a particular set of headphones are wirelessly connected to a particular controlled-environment facility resident communication and/or media device through a secure application program (app) on the controlled-environment facility resident communication and/or media device, and/or through a modified operating system of the controlled-environment facility resident communication and/or media device. This app, and/or the device operating system are configurable in accordance with rules regulations, restrictions and/or the like of the controlled-environment facility in which the headphones and controlled-environment facility resident communication and/or media device are being used.

In accordance with embodiments of the present systems and methods, the app, and/or the device operating system, will allow only a specified set of headphones to be connected to the particular controlled-environment facility resident communication and/or media device (on which the app is running) or vice versa. The present wireless headphones may also include a microphone incorporated into the headphones, which is likewise linked exclusively to the particular controlled-environment facility resident communication and/or media device.

The controlled-environment facility resident communication and/or media device and headphones so linked may be used to place or receive voice and/or video calls, under the control of a controlled-environment facility communication processing system, or the like. Likewise the exclusively linked controlled-environment facility resident communication and/or media device and headphones may be used to listen to music, and/or audio content of videos, downloaded or streamed to the linked controlled-environment facility resident communication and/or media device in accordance with rules regulations, restrictions and/or the like of the controlled-environment facility. The controlled-environment facility resident communication and/or media device and headphones so linked may be used to listen to audio content of video games, educational content, and/or the like. In accordance with some embodiments of the present systems and methods, the headphones, so linked may also restrict controlled-environment facility residents, such as correctional facility inmates from listening to certain content. Also, in accordance with embodiments of the present systems and methods headphones so linked may enable controlled-environment facility administration to barge into the headphones for announcements. In some implementations a headphone microphone may be used to control or otherwise interact with the video games, educational content, and/or the like, if supported by the video game, educational content, and/or the like.

A controlled-environment facility may implement the present wireless headphones to communicate with residents/inmates. In such embodiments, announcements, or other notifications to controlled-environment facility resident communication and/or media devices, and in accordance with embodiments of the present systems and methods, play of media, or the like, on a controlled-environment facility resident communication and/or media device may be interrupted (e.g., muted, paused, terminated, or the like), as appropriate with respect to the media content. The controlled-environment facility resident communication and/or media device headphone app, or the like may then play the notification over the linked headphones. Alternatively, or additionally, in some implementations the controlled-environment facility may transmit the notification directly to the present wireless headphones. In such implementations short-range wireless protocol, or similar, transmitters, which may include Ultra-Wide Band (UWB), Bluetooth, ZigBee, and Wireless USB, or similar, transmitters of controlled-environment facility resident communication and/or media devices linked to the particular headphones, or in some embodiments all controlled-environment facility resident communication and/or media devices regardless of whether the controlled-environment facility resident communication and/or media devices are so linked, may be used to transmit the notification to any and all of the present wireless headphones. Such notifications may be directed to all, some, or one particular controlled-environment facility resident and thereby to all, some, or one particular controlled-environment facility resident communication and/or media device and/or headphones, as described above. For example, the message may be directed to a select group of controlled-environment facility resident communication and/or media device and/or headphones, controlled-environment facility resident communication and/or media devices and/or headphones in a particular area of the controlled-environment facility, and/or the like.

In accordance with embodiments of the present systems and methods, headphones 105 may incorporate Global Positioning System (GPS) technology which may be used by the controlled-environment resident communication and/or media device headphones app, or the like, to locate or track lost or stolen headphones, including through the use of "crowd GPS" for headphones reported as lost or stolen. Similarly, or alternatively, the controlled-environment resident communication and/or media device may employ the headphones app, or the like, to find lost or stolen headphones using detection of short-range wireless protocol signals emitted by the headphones.

In embodiments of the present systems and methods, controlled-environment facilities may be enabled to configure and/or monitor the controlled-environment facility resident communication and/or media device headphone app, and/or related aspects of the operating system of the controlled-environment facility resident communication and/or media devices, remotely. For example, the app, and/or related aspects of the operating system of the controlled-environment facility resident communication and/or media devices, may be configurable based on the facility, site, area within the facility, and/or with respect to an individual resident/inmate, or group of residents/inmates.

Furthermore, in accordance with some aspects of the present systems and methods, the controlled-environment facility may be enabled to detect, monitor and/or locate (all) authorized and unauthorized short-range communication devices within the facility (and nearby) through the controlled-environment facility resident communication and/or media device headphone app and/or the (modified) operating system of the controlled-environment facility resident communication and/or media devices.

The controlled-environment facility resident communication and/or media device headphone app may be exclusively offered on controlled-environment facility resident communication and/or media devices offered or provided by a particular controlled-environment facility vendor. Likewise, the wireless headphones of the present systems and methods may be exclusively offered, or otherwise provided by the same controlled-environment facility vendor, for exclusively linking to a particular controlled-environment facility resident communication and/or media device provided by the controlled-environment facility vendor. In accordance with some such embodiments, the app or operating system of the controlled-environment facility resident communication and/or media devices provided by the controlled-environment facility vendor may disallow all other short-range communication standard devices from paring with it. Likewise, the wireless headphones offered by the controlled-environment facility vendor may be configured to only allow connection, via a short-range wireless protocol, or the like, to a specified controlled-environment facility resident communication and/or media device provided by the controlled-environment facility vendor. In accordance with the above, the wireless headphones and controlled-environment facility resident communication and/or media devices of the present systems and methods may be co-branded.

Thus, in accordance with embodiments of the present systems and methods which restrict a set of wireless headphones to use with a particular controlled-environment facility resident communication and/or media device, a controlled-environment facility resident communication and/or media device disposed within a controlled-environment facility wirelessly communicatively links a set of wireless headphones with the controlled-environment facility resident communication and/or media device. The controlled-environment facility resident communication and/or media device dedicates the set of wireless headphones to the controlled-environment facility resident communication and/or media device by restricting the set of wireless headphones to use with the controlled-environment facility resident communication and/or media device.

FIG. 1 is a diagrammatic illustration of example controlled-environment 100, wherein an example embodiment of present headphones 105 dedicated to (restricted to use with) a particular controlled-environment facility resident communication and/or media device 110 may be employed, in accordance with some embodiments. In environment 100, communications processing system 115 may provide telephone services, videoconferencing, online chat, and other communication services to residents of controlled-environment facility 120. In some cases, such as illustrated, communications processing system 115 may be co-located with controlled-environment facility 120. Alternatively, or additionally, an external centralized communication processing system may be deployed in a controlled-environment facility vendor (e.g. a controlled-environment facility communications provider) datacenter 125, or the like. That is, communications processing system 115 may be centrally and/or remotely located with respect to one or more controlled-environment facilities and/or may provide communication services to multiple controlled-environment facilities, in which case, controlled-environment facility 120 is illustrated as one example. Such a controlled-environment facility vendor datacenter may be connected to such facilities via a public network (e.g. the Internet) or a private network (e.g. intranet) 130, or the like (e.g. via a secure tunneling protocol over the internet, using encapsulation). More generally, however, it should be noted that communication system 115 may assume a variety of forms, including telephony switches such as electronic switching systems, or the like, and/or and may be configured to serve a variety of facilities and/or users, whether within or outside of a controlled-environment facility.

Residents may use more-or-less conventional telephones 135 to access certain communication services. However, in accordance with embodiments of the present systems and methods, residents may also use a controlled-environment facility resident communication and/or media device 110, or the like, such as in conjunction with present headphones 105 dedicated to (restricted to use with) a particular controlled-environment facility resident communication and/or media device. For example, personal computer wireless devices, such as a tablet computing device or smartphone (110), which may have been adapted and/or approved for use in controlled-environment facility, may be used by controlled-environment facility residents for communication. Such a personal resident device may be referred to as an Intelligent Resident Device (IRD), "controlled-environment facility personal communication and/or media device," or the like, in controlled-environment facilities, in general. These may include "controlled-environment facility personal resident communication and/or media devices," and may be referred to as an Intelligent Inmate Device (IID), "inmate personal communications and/or media device," or the like, in a correctional institution environment.

Additionally, or alternatively, a resident may use a "controlled-environment facility resident communal communication and/or media terminal" 140, or the like, to place voice calls, as well as for video communication, execution of other application programs (apps), including media apps, games, job search apps, etc. Such a controlled-environment facility video communication terminal may be referred to as an Intelligent Facility Device (IFD), which may be a video phone particularly adapted for use in a controlled-environment facility. Generally speaking, multiple controlled-environment facility resident communal communication and/or media terminals/IFDs 140 are disposed in a controlled-environment facility, and may be disposed in a visitation room, in a pod, as part of a kiosk, as an alternative to a controlled-environment facility communication kiosk, etc. As will be appreciated, IRD 110, IFD 140, or other similar devices have video conferencing capabilities, or the like, to enable a party to participate in video communication sessions with other call parties, such as non-residents of the controlled-environment facility, via video communication, secure online chat, etc. In some cases, IFD 140 may assume the form of any computer, tablet computer, smart phone, etc., or any other consumer device or appliance with videoconferencing capabilities. For example, in a correctional facility environment a tablet computing device (e.g., an IRD 110) may be mounted on a wall, in a hardened case, as a controlled-environment facility resident communal communication and/or media terminal or IFD (140). IFD 140 may also take the form of a docking station adapted to support and interface with an IRD 110 to provide communication, data, or other services.

Personal controlled-environment facility resident communication and/or media devices, IRDs 110, may be tablet computing devices, smartphones, media players, smart watches, or the like adapted and/or approved for use by residents of the controlled-environment facility (within the controlled-environment facility). Each IRD 110 may be particularly adapted for use in a controlled environment. For example, in a correctional institution, jail, or the like, such an IRD, or IID, may have a specifically adapted operating system and/or may be "stripped-down," particularly from the standpoint of what apps and/or hardware are provided or allowed on IRD 110, and/or connectivity afforded such an IRD. For example, such an IRD may employ an operating system kernel built for use in such an IRD in a controlled-environment facility. As a further example, the IRD may be adapted to only connect to a network provided by the controlled-environment facility, and/or in only certain locations, within the controlled-environment facility, such as may be controlled by availability of Wi-Fi access, or the like, only being available in certain areas. That is, for example, where streaming and/or downloading may be compartmentalized, leveraging the (concrete and steel) structure (i.e. construction, layout, etc.) of the controlled-environment facility, for example, limiting the availability of a Wi-Fi signal, providing the stream through the placement of wireless access points, antenna directionality of such wireless access points, and/or the like. Further, the IRD may allow access to apps or content only upon application of security measures, by the IRD. Such security measures may include determining, by the IRD, DNS spoofing, DNS redirection, use of proxy servers for privacy and security, biometric validation, password validation, and/or the like. Also, in accordance with embodiments of the present systems and methods, the IRD may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on IRDs might include apps of particular interest to residents of the controlled-environment facility. For example, IRDs provided to inmates of correctional facilities, might include apps that may be of particular use to an inmate, in general, such as access to a legal research service, or of more specific interest, such as providing an inmate nearing release, access to employment searching apps or the like. Hence, such inmate IRDs may be used to help soon to be released inmates transition. For example, the IRD may be used to communicate with a future employer, or the like. As such, IRDs may be sponsored, or otherwise subsidized by organizations or companies, assisting with the transition of inmates into society, or the like.

Hence, in accordance with embodiments of the present systems and methods, the operating system for each of these controlled-environment facility communication and/or media devices, or a persistent app running each of these controlled-environment facility communication and/or media devices (under the operating system) or the like, may, in accordance with embodiments of the present systems and methods restrict headphones 105 to use with a particular controlled-environment facility resident communication and/or media device (110). To wit, controlled-environment facility resident communication and/or media device 110 wirelessly communicatively links with wireless headphones 105, such as by "paring" with the headphones via a short-range communication standard and respective short-range communication hardware and functionality in controlled-environment facility resident communication and/or media device 110 and wireless headphones 105. Such a short-range communication standard may include UWB, Bluetooth, ZigBee, Wireless USB, and/or the like. Upon which, wireless headphones 105 are restricted to use with controlled-environment facility resident communication and/or media device 110, such as by serializing the headphones using serial numbers of headphones 105 and controlled-environment facility resident communication and/or media device 110 the during the pairing process, thereby dedicating wireless headphones 105 to use with controlled-environment facility resident communication and/or media device 110. That is, the respective set of wireless headphones is not allowed to be "paired" or otherwise linked to another (controlled-environment facility resident communication and/or media) device, and vice versa, the device is not allowed to be paired with any other headphones. The wireless headphone app (persistently) running on the controlled-environment facility resident communication and/or media device, and/or the operating system of the controlled-environment facility resident communication and/or media device may link the device and headphones, and/or dedicate the headphones to the device. Through such pairing linkage of headphones 105 and controlled-environment resident communication and/or media device 110 and/or predetermined assignment of a particular set of headphones to a particular controlled-environment resident communication and/or media device, or the like headphones 105 may, in accordance with embodiments of the present systems and methods be restricted not only from use with other controlled-environment resident communication and/or media devices, but also from use with contraband device (e.g. contraband cell phones), or the like.

Controlled-environment facility communication processing system 115 and/or centralized controlled-environment facility vendor datacenter 125 may be enabled to configure wireless headphones 105, controlled-environment facility resident communication and/or media device 110, and/or a wireless headphones app (persistently) running on the controlled-environment facility resident communication and/or media device, remotely.

In various embodiments, to access communication services, a resident may initiate approved telephone services by lifting the receiver on telephone 135 or IFD 140, and/or otherwise initiating a call, such as by launching a communications app on IRD 110 (or IFD 140). At which time, the resident may be prompted to provide a personal identification number (PIN), other identifying information and/or biometrics. An Interactive Voice Response (IVR) unit (not shown, but which may be integrated into communication processing system 115) may generate and play a prompt, or other messages, to the resident on device 110, 135 or 140. Which, in accordance with the present systems and methods may be heard over headphones 105 with respect to a call initiated by controlled-environment facility resident communication and/or media device 110. To wit, wireless headphones 105 may also include a microphone, such as may be incorporated into the headphones' housing. Under the control of communication processing system 115, devices 110, 135 or 140 may be capable of connecting to a non-resident's (i.e., a person not incarcerated or otherwise committed to a controlled-environment facility) telephone 145 across a Publicly Switched Telephone Network (PSTN) 150. For example, telephone 145 may be located at a non-resident's home or office, at a resident visitation center, etc. Telephony switch 155, in communication processing system 115, may be used to connect calls across PSTN 150. Additionally or alternatively, the non-resident may communicate using device 160, which may be a mobile phone, tablet computing device, personal computer, or the like, which may be connected through an Integrated Services Digital Network (ISDN), Voice-over-IP (VoIP), or packet data network (such as, for example the Internet), a wireless communications network, or the like 130. Telephony router 165 of communication processing system 115 is used to route data packets associated with a call connection to device 160. For example, a non-resident party may have a device 160 with a built-in front-facing camera, or the like, and an integrated display (e.g., a smart phone, tablet, etc., as illustrated), a personal computer with a webcam, etc. A network connection between the parties may be established and supported by an organization or commercial service that provides computer services and software for use in telecommunications and/or VOIP, such as SKYPE®. Additionally, or alternatively, the correctional facility and/or the destination may use videoconferencing equipment compatible with ITU H.323, H.320, H.264, and/or V.80, or other suitable standards.

Centralized investigative data aggregation and analysis system 170 may be a platform for providing investigative tools in communication, such as via public network 130, with controlled-environment facility 120, namely controlled-environment facility communications processing system 115, and/or the like. Such investigative tools may provide collection, processing, analysis, and/or reporting of information for intelligence purposes. In some embodiments, the investigative tools may provide functions such as entity linkage analysis, communication statistics, organization analysis, communication behavior analysis, subscription usage analysis, common communication analysis, timelines, correlations, mapping, word search, language translation (whether machine translation or access to translation services), call recording (whether terminated external to the controlled-environment facility or internally thereto), call notification, call monitoring (whether real-time or recorded, and whether monitoring a particular call or a plurality of calls), call "barging," call control, visitation monitoring/background checking, crime tip conduit, account activity monitoring (whether tracing deposits and expenditures of monies or monitoring account trends and behavior, such as velocity of transactions), multiple database querying, and resource integration, and/or the like. One or more of these investigative tools may be provided through an intuitive user interface to provide ease of use, facilitate operation across a variety of user terminals, and/or to facilitate remote access to one or more features thereof. For example, in some cases, a web-based portal enabling individuals to store and transmit information, including forensic tools that analyze communications into and out of controlled-environment facilities to assist law enforcement may be provided. Such a web page portal may have menus comprising an investigator dashboard, to present and facilitate execution of various investigative operations. These investigative tools may log calls (e.g., as Call Detail Records (CDRs)), so that an investigator may research them through an archive and may be provided access to internal and/or external criminal databases and/or other sources of useful information.

In addition to providing certain visitation and communication operations, communication processing system 115 may attempt to ensure that a resident's calls, video conferences, online chats, etc. are performed only with non-residents whose identities, devices, email addresses, phone numbers, etc. are listed in that resident's Pre-Approved Contact (PAC) and/or Pre-Approved Number (PAN) list. Each resident's PAC and/or PAN list(s) may be stored, for example, in (a) database(s) maintained by controlled-environment facility vendor datacenter 125, centralized investigative data aggregation and analysis system 170, and/or the like. In addition to PAC and/or PAN list(s), controlled-environment facility vendor datacenter 125, centralized investigative data aggregation and analysis system 170, and/or the like, may also store Resident Profile Data (RPD), as well as communication and/or visitation rules applicable to each resident. This controlled-environment facility vendor datacenter 125 and/or centralized investigative data aggregation and analysis system 170 database(s) may include information such as balances for resident trust and calling accounts; trial schedule; conviction data; criminal record; sentencing data, such as time served, time remaining to be served, and release date; cell and cellmate assignments; resident restrictions and warnings; commissary order history; telephone call history; call recordings; known or suspected gang or criminal affiliations; known or suspected affiliates, accomplices, or gang members; and any other information that may be relevant or useful to correctional facility staff to house and maintain residents. Controlled-environment facility resident account management system 175, which may be a separate system, or which may be a part or function of controlled-environment facility vendor datacenter 125, as illustrated, may maintain resident accounts to the benefit of the respective resident, such as resident commissary accounts, resident communications accounts, which may be used to pay for purchase of a controlled-environment facility resident communication and/or media device (110), paired headphones 105, communications, such as phone calls, video visitation, internet chats, emails, text messages, or the like. Likewise, in accordance with some embodiments of the present systems and methods controlled-environment facility vendor datacenter 125, centralized investigative data aggregation and analysis system 170, and/or the like, particularly, resident account management system 175 may maintain information about restrictive linkages of controlled-environment facility resident communication and/or media devices (110) and respective assigned headphones (105), including predetermined assignment of a particular set of headphones to a particular controlled-environment resident communication and/or media device.

In some implementations, communication processing system 115 may be configured to perform communication monitoring operations, such being configured to monitor and or record communication sessions (e.g., as electronic video files). In accordance with some embodiments of the present systems and methods, controlled-environment facility 120, and/or centralized controlled-environment facility vendor datacenter 125, may issue, such as via controlled-environment facility communication processing system 115, wirelessly transmitted notifications to one or more controlled-environment facility controlled-environment facility resident communication and/or media devices 110 and/or directly to one or more wireless headphone sets 105. Such direct notifications to headphones 105 may be sent directly to wireless headphones 105 by broadcasting the notification on (a) frequenc(y)(ies) used by the short-range protocols employed in accordance with embodiments of the present systems and methods. Controlled-environment facility resident communication and/or media device 110, the wireless headphones app (persistently) running on controlled-environment facility resident communication and/or media device 110, and/or wireless headphones 105 that directly receiving the notification may interrupt play of media on the controlled-environment facility resident communication and/or media device 110, by muting, pausing, terminating, etc. play of the media in a manner best suited for that media. Controlled-environment facility resident communication and/or media device 110 and/or headphones 105 then plays the notification over wireless headphones 105.

As noted, in accordance with some embodiments of the present systems and methods, controlled-environment facility resident communication and/or media devices 110, may be able to detect short-range wireless protocol signals not associated with the detecting controlled-environment facility resident communication and/or media device and/or a set of wireless headphones (105) dedicated thereto. Controlled-environment facility resident communication and/or media device 110 may generate and alert to the controlled-environment facility (i.e. controlled-environment facility communication processing system 115, or the like), and/or centralized investigative data aggregation and analysis system 170, to a location of the detected short-range wireless signals. Hence, in some embodiments of the present systems and methods, the alerts provided herein in response to detection, by a controlled-environment facility resident communication and/or media device (110), of short-range wireless protocol signals, or the like, may be routed to, or via, centralized investigative data aggregation and analysis system 170, such as to alert or notify investigative personnel, other personnel associated with the controlled-environment facility (120) in which the reporting controlled-environment facility resident communication and/or media device is located, or the like. Additionally, or alternatively, controlled-environment facility resident communication and/or media device 110, may re-transmit (forward) the short-range wireless signals to the controlled-environment facility, and/or the centralized investigative data aggregation and analysis system, for monitoring.

Likewise, contraband wireless communication device detection may use one or more controlled-environment facility communication and/or media devices 110 and/or wireless headphones 105, through short-range communication protocol signal detection, and/or they may each include a radio frequency detection mechanism configured to detect presence of electromagnetic energy emissions in one or more frequency bands reserved for wireless communication by wireless communication devices. In such embodiments, each controlled-environment facility communication and/or media device reports detection of the presence of the electromagnetic energy emissions in one or more frequency bands reserved for wireless communication by wireless communication devices and/or short-range communication protocol signals to an investigative data aggregation and analysis system 170. The location of the reporting device(s) and/or signal strength of the emission(s) and/or short-range signals may be used by the investigative data aggregation and analysis system to determine a location, within the controlled-environment facility, of a contraband wireless communication device emitting the electromagnetic energy emissions and/or short-range communication protocol signal.

Centralized investigative data aggregation and analysis system 170, or the like, may function to determine, and/or refine, a location of a detected contraband wireless device, using location of the reporting controlled-environment facility communication and/or media device(s), signal strength(s), directionality(s) and/or the like of the detected short-range wireless protocol signals, data concerning the structure of the controlled-environment facility, triangulation, and/or the like. Such detection and determination, and/or refinement, of a location of a detected contraband wireless device is disclosed in co-pending, co-owned U.S. patent application Ser. No. 16/703,052, filed Dec. 4, 2019, which is hereby incorporated herein by reference.

Headphones 105 may, in certain embodiments, include physical (mechanical) buttons. In accordance with various embodiments of the present systems and methods, such buttons may be used as a skip for songs, to control headphone volume, to pause and resume playback, or the like. Additionally, or alternatively, in some embodiments, pressing a certain combination of such buttons on the wireless headphones may result in issuance of an emergency alert to signal an emergency to controlled-environment facility personnel, such as to a correctional facility officer. Further, in some embodiments the headphones may signal, audibly, or visually, that the headphone's battery is going to die. Headphones 105 may be able to be charged wirelessly, may be water resistant, etc., in accordance with various embodiments.

Computer-based environment components may include programing and/or hardware to implement embodiments of the present systems and methods. This programming may take the form of stored program instructions, programed firmware, or the like, while hardware might take the form of an Application Specific Integrated Circuit (ASIC), or the like, to carry out such aspects of embodiments of the present systems and methods.

Thus, in accordance with embodiments of the present systems and methods, a controlled-environment facility resident communication and/or media device (IRD 110), or the like, may include at least one processor and a memory coupled to the at least one processor, such as discussed in greater detail below, with reference to FIG. 3. This memory may be configured to store program instructions executable by the at least one processor. Such program instructions may include a controlled-environment facility resident communication and/or media device operating system and/or a controlled-environment facility resident communication and/or media device headphones app.

FIG. 2 is a flowchart of process 200 for dedicating a set of headphones for use restricted to a particular controlled-environment facility resident communication and/or media device, etc., in accordance with some embodiments of the present systems and methods. Therein use of a particular set of wireless headphones, which may include a microphone, is restricted to use with a particular controlled-environment facility resident communication and/or media device. To wit, at 205, a respective controlled-environment facility resident communication and/or media device (110) disposed within a controlled-environment facility wirelessly communicatively links a respective set of wireless headphones (105) with the respective controlled-environment facility resident communication and/or media device. To this end a wireless headphones app (persistently) running on the controlled-environment facility resident communication and/or media device, and/or the operating system of the controlled-environment facility resident communication and/or media device may wirelessly communicatively link the set of wireless headphones with the controlled-environment facility resident communication and/or media device, at 205.

At 210, the respective set of wireless headphones is restricted to use with the respective controlled-environment facility resident communication and/or media device, such as by serializing the headphones using serial numbers of the headphones and the controlled-environment facility resident communication and/or media device, during a pairing process, thereby dedicating the respective set of wireless headphones to use with the respective controlled-environment facility resident communication and/or media device. To wit, this linkage may use predetermined assignment of a particular set of headphones to a particular controlled-environment resident communication and/or media device, or the like. To such ends a wireless headphones app (persistently) running on the controlled-environment facility resident communication and/or media device, and/or the operating system of the controlled-environment facility resident communication and/or media device may dedicate the set of wireless headphones to the controlled-environment facility resident communication and/or media device by restricting use of the set of wireless headphones to use with the controlled-environment facility resident communication and/or media device, at 210. In some embodiments, there may be restrictions that restricts the respective set of wireless headphones to not allow it to be "paired" or otherwise linked to another controlled-environment facility resident communication and/or media device.

Additionally, the controlled-environment facility may be enabled to configure the controlled-environment facility resident communication and/or media device, the controlled-environment facility resident communication and/or media device wireless headphones app, the set of wireless headphones, and/or the association(s) therebetween, remotely. Likewise, the controlled-environment facility may also be enabled to remotely monitor communication by and/or between the controlled-environment facility resident communication and/or media device and the dedicated set of wireless headphones. Such which communications may be carried out via the controlled-environment facility resident communication and/or media device wireless headphones app, in various embodiments.

In accordance with some embodiments of the present systems and methods, the controlled-environment facility (120) may issue, a wirelessly transmitted notification to one or more of the controlled-environment facility controlled-environment facility resident communication and/or media devices disposed within the controlled-environment facility and/or directly to one or more of the sets of wireless headphones disposed within the controlled-environment facility, at 215.

At 220, respective controlled-environment facility resident communication and/or media device(s) (e.g., the wireless headphones app(s) (persistently) running on the respective controlled-environment facility resident communication and/or media device(s)), and/or respective sets of wireless headphones, directly, receiving the notification may interrupt play of media on the respective controlled-environment facility resident communication and/or media device and/or the respective sets of wireless headphones, by muting, pausing, terminating, etc. play of the media in a manner best suited for that media. For example, playback of content stored on the respective controlled-environment facility resident communication and/or media device may merely be paused, while streaming recorded content may be terminated, to be restarted later, live-streaming content may be muted, for the duration of the notification/announcement, etc. Regardless, at 225, the respective controlled-environment facility resident communication and/or media device plays the notification over the set of wireless headphones dedicated to use with the respective controlled-environment facility resident communication and/or media device, and/or a set of wireless headphones receiving the notification, directly, plays the notification, directly. Such direct notifications may be sent directly to (a) set(s) of wireless headphones by broadcasting the notification on (a) frequenc(y)(ies) used by the short-range protocols employed in accordance with embodiments of the present systems and methods by the set(s) of wireless headphones.

Further, in accordance with embodiments of the present systems and methods, the controlled-environment facility resident communication and/or media device, may be able to detect short-range wireless signals not associated with the controlled-environment facility resident communication and/or media device and/or the dedicated set of wireless headphones at 230. At 235, the controlled-environment facility resident communication and/or media device, may generate an alert to the controlled-environment facility, and/or a centralized investigative data aggregation and analysis system (170), to a location of the detected short-range wireless signals. Additionally, or alternatively, the controlled-environment facility resident communication and/or media device, may transmit (forward) the short-range wireless signals to the controlled-environment facility, and/or the centralized investigative data aggregation and analysis system, for monitoring. Likewise, one or more controlled-environment facility communication and/or media devices (110) and/or wireless headphones (105) may be used for contraband wireless communication device detection, through short-range communication protocol signal detection, and/or the devices and/or headphones may each include a radio frequency detection mechanism configured to detect presence of electromagnetic energy emissions in one or more frequency bands reserved for wireless communication by wireless communication devices. In such embodiments, each controlled-environment facility communication and/or media device reports detection of the presence of the electromagnetic energy emissions in one or more frequency bands reserved for wireless communication by wireless communication devices and/or short-range communication protocol signals to the investigative data aggregation and analysis system (170), similar to step 235. The location of the reporting device(s) and/or signal strength of the emission(s) and/or short-range signals may be used by the investigative data aggregation and analysis system to determine a location, within the controlled-environment facility, of a contraband wireless communication device emitting the electromagnetic energy emissions and/or short-range communication protocol signal.

Thus, elements of the various embodiments of the present systems and methods, such as the controlled-environment facility resident communication and/or media device headphones app, may be exclusively offered on controlled-environment facility resident communication and/or media devices offered or provided by a particular controlled-environment facility vendor. Similarly, the wireless headphones of the present systems and methods may be exclusively offered, or otherwise provided by the same controlled-environment facility vendor, for exclusively linking to a particular controlled-environment facility resident communication and/or media device provided by the controlled-environment facility vendor. Thereby, the app or operating system of the controlled-environment facility resident communication and/or media devices provided by the controlled-environment facility vendor may disallow all other short-range communication standard devices from paring with it, while, the wireless headphones offered by the controlled-environment facility vendor may be configured to only allow connection, via short-range wireless protocol, or the like, to a specified controlled-environment facility resident communication and/or media device provided by the same controlled-environment facility vendor. Thereby, the wireless headphones and controlled-environment facility resident communication and/or media devices of the present systems and methods may be co-branded, in accordance with the above.

Embodiments of the present systems and methods, wherein headphones are restricted to use with a particular controlled-environment facility resident communication and/or media device, as described herein, may be implemented in part as, or executed, at least in part, by one or more computer systems. One such computer system is illustrated in FIG. 3. In various embodiments, computer system 300 may be a server, a mainframe computer system, a workstation, a network computer, a desktop computer, a laptop, a tablet computing device, media player, or the like. For example, in some cases, computer 300 may implement one or more steps of example process 200 described above with respect to FIG. 2, and/or a computer system such as computer system 300 may be used as part of, one or more of: controlled-environment facility resident communication and/or media devices (IRDs) 110; controlled environment facility communication processing systems 115; controlled-environment facility vendor data center 125; IFDs 140; centralized investigative data aggregation and analysis system 170; non-resident communications devices 160; and/or the like. In various embodiments two or more of these computer systems may be configured to communicate with each other in any suitable way, such as, for example, via public network 130, which may be the Internet, or the like, as discussed above, via a local area network using wired or wireless functionality, etc.

As illustrated, computer system 300 includes one or more processors 310A-N coupled to a system memory 320 via bus 330. Computer system 300 further includes a network interface 340 coupled to bus 330, and one or more I/O controllers 350, which in turn are coupled to peripheral devices such as cursor control device 360, keyboard 370, display(s) 380, etc. Each of I/O devices 360, 370, 380 may be capable of communicating with I/O controllers 350, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 300 may be a single-processor system including one processor 310A, or a multi-processor system including two or more processors 310A-N (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or another dedicated graphics-rendering device.

System memory 320 may be configured to store program instructions and/or data accessible by processor 310. In various embodiments, system memory 320 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 320 as program instructions 325 and data storage 335, respectively. In other embodiments, program instructions and/or data may be received, sent, or stored upon different types of computer-accessible media or on similar media separate from system memory 320 or computer system 300.

A computer-accessible medium may include any tangible and/or non-transitory storage media or memory media such as electronic, magnetic, or optical media—e.g., disk or CD/DVD-ROM coupled to computer system 300 via bus 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 330 may be configured to coordinate I/O traffic between processor 310, system memory 320, and any peripheral devices in the computer system, including network interface 340 or other peripheral interfaces, such as I/O devices 360, 370, 380. In some embodiments, bus 330 may perform any necessary protocol, timing, or other data transformations to convert data signals from one component (e.g., system memory 320) into a format suitable for use by another component (e.g., processor 310). In some embodiments, bus 330 may include support for devices attached through various types of peripheral buses, such as a variant of the Peripheral Component Interconnect (PCI) bus standard or the Universal Serial Bus (USB) standard, for example. In some embodiments, the function of bus 330 may be split into two or more separate components, such as a northbridge chipset and a southbridge chipset, for example. In addition, in some embodiments some or all the functionality of bus 330, such as an interface to system memory 320, may be incorporated directly into processor(s) 310A-N.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 350 may, in some embodiments, enable communications with one or more display terminals, keyboards, keypads, touchpads, scanning devices, voice or optical recognition devices, mobile devices, or any other devices suitable for entering or retrieving data by one or more computer system 300. Multiple I/O controllers 350 may be present in computer system 300 or may be distributed on various nodes of computer system 300. In some embodiments, I/O devices may be separate from computer system 300 and may interact with one or more nodes of computer system 300 through a wired or wireless connection, such as over network interface 340.

As shown in FIG. 3, system memory 320 may include program instructions 325, configured to implement certain embodiments described herein, and data storage 335, comprising various data may be accessible by program instructions 325. In an embodiment, program instructions 325 may include software elements, which may be configured to affect the operations discussed in FIGS. 1 and 2. Program instructions 325 may be implemented in various embodiments using any desired programming language, scripting language, or combination of programming languages and/or scripting languages (e.g., C, C++, C#, JAVA®, JAVASCRIPT®, PERL®, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various operations described herein, particularly in connection with FIGS. 1 through 3, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system restricting use of a set of wireless headphones to use with a particular controlled-environment facility resident communication and/or media device, the system comprising:
    a respective set of wireless headphones disposed within a controlled-environment facility;
    a respective controlled-environment facility resident communication and/or media device disposed within the controlled-environment facility, the respective controlled-environment facility resident communication and/or media device configured to:
        wirelessly communicatively link the respective set of wireless headphones with the respective controlled-environment facility resident communication and/or media device; and
        dedicate the respective set of wireless headphones to the controlled-environment facility resident communication and/or media device by restricting the respective set of wireless headphones to use with the respective controlled-environment facility resident communication and/or media device.

2. The system of claim 1, wherein the respective controlled-environment facility resident communication and/or media device further comprises a wireless headphones application program installed and running on the respective controlled-environment facility resident communication and/or media device, configuring the respective controlled-environment facility resident communication and/or media device to wirelessly communicatively link the respective set of wireless headphones with the respective controlled-environment facility resident communication and/or media device and dedicate the respective set of wireless headphones to the respective controlled-environment facility resident communication and/or media device by restricting use of the set of wireless headphones to use with the controlled-environment facility resident communication and/or media device.

3. The system of claim 1, wherein an operating system of the respective controlled-environment facility resident communication and/or media device, configures the respective controlled-environment facility resident communication and/or media device to wirelessly communicatively link the respective set of wireless headphones with the respective controlled-environment facility resident communication and/or media device and dedicate the respective set of wireless headphones to the respective controlled-environment facility resident communication and/or media device by restricting use of the set of wireless headphones to use with the controlled-environment facility resident communication and/or media device.

4. The system of claim 1, wherein restricting the respective set of wireless headphones to use with the respective controlled-environment facility resident communication and/or media device further comprises serializing the respective set of wireless headphones using serial numbers of the respective set of wireless headphones and the respective controlled-environment facility resident communication and/or media device, during wirelessly communicatively linking the respective set of wireless headphones with the respective controlled-environment facility resident communication and/or media device.

5. The system of claim 1, wherein the respective controlled-environment facility resident communication and/or media device is further configured to:
    interrupt play of media on the respective controlled-environment facility resident communication and/or media device, over the respective set of wireless headphones, in response to receipt of a notification wirelessly transmitted by the controlled-environment facility, within the controlled-environment facility; and
    play the notification over the respective set of wireless headphones.

6. The system of claim 1, wherein the respective set of wireless headphones is configured to interrupt play of media on the respective set of wireless headphones, in response to receipt of a notification wirelessly transmitted by the controlled-environment facility, within the controlled-environment facility; and
    play the notification over the respective set of wireless headphones.

7. The system of claim 1, wherein the controlled-environment facility is enabled to configure the respective controlled-environment facility resident communication and/or media device and the respective set of wireless headphones, remotely.

8. The system of claim 1, wherein the controlled-environment facility is enabled to monitor communication between the respective controlled-environment facility resident communication and/or media device and the respective set of wireless headphones, remotely.

9. The system of claim 1, wherein the respective controlled-environment facility resident communication and/or media device is further configured to:
    detect short-range wireless signals not associated with the respective controlled-environment facility resident communication and/or media device and/or the respective set of wireless headphones; and
    generate an alert to the controlled-environment facility to a location of, and/or transmit to the controlled-environment facility, the short-range wireless signals not associated with the respective controlled-environment facility resident communication and/or media device and/or the respective set of wireless headphones.

10. The system of claim 1, wherein the respective set of wireless headphones comprises a microphone.

11. A method for providing wireless headphones restricted to use with a particular controlled-environment facility resident communication and/or media device, the method comprising:
    wirelessly communicatively linking, by a controlled-environment facility resident communication and/or media device disposed within a controlled-environment facility, a set of wireless headphones with the controlled-environment facility resident communication and/or media device; and dedicating, by the controlled-environment facility resident communication and/or media device, the set of wireless headphones to the controlled-environment facility resident communication and/or media device by restricting the set of wireless headphones to use with the controlled-environment facility resident communication and/or media device.

12. The method of claim 11, further comprising installing and/or providing a wireless headphones application program on the controlled-environment facility resident communication and/or media device, and running the wireless headphones application program on the controlled-environment facility resident communication and/or media device, and wherein:

wirelessly communicatively linking, by the controlled-environment facility resident communication and/or media device, the set of wireless headphones with the controlled-environment facility resident communication and/or media device further comprises wirelessly communicatively linking, by the application program, the set of wireless headphones with the controlled-environment facility resident communication and/or media device; and dedicating, by the controlled-environment facility resident communication and/or media device, the set of wireless headphones to the controlled-environment facility resident communication and/or media device further comprises dedicating, by the application program, the set of wireless headphones to the controlled-environment facility resident communication and/or media device by restricting use of the set of wireless headphones to use with the controlled-environment facility resident communication and/or media device.

13. The method of claim 11, further comprising wherein:

wirelessly communicatively linking, by a controlled-environment facility resident communication and/or media device, the set of wireless headphones with the controlled-environment facility resident communication and/or media device further comprises wirelessly communicatively linking, by an operating system of the controlled-environment facility resident communication and/or media device, the set of wireless headphones with the controlled-environment facility resident communication and/or media device; and dedicating, by the controlled-environment facility resident communication and/or media device, the set of wireless headphones to the controlled-environment facility resident communication and/or media device further comprises dedicating, by the operating system of the controlled-environment facility resident communication and/or media device, the set of wireless headphones to the controlled-environment facility resident communication and/or media device by restricting use of the set of wireless headphones to use with the controlled-environment facility resident communication and/or media device.

14. The method of claim 11, wherein restricting the set of wireless headphones to use with the controlled-environment facility resident communication and/or media device further comprises serializing the set of wireless headphones using serial numbers of the set of wireless headphones and the controlled-environment facility resident communication and/or media device, during wirelessly communicatively linking the set of wireless headphones with the controlled-environment facility resident communication and/or media device.

15. The method of claim 11, further comprising:

issuing, by the controlled-environment facility, a wirelessly transmitted notification to at least one controlled-environment facility resident communication and/or media device disposed within the controlled-environment facility;

interrupting, by a respective controlled-environment facility resident communication and/or media device, play of media on the respective controlled-environment facility resident communication and/or media device; and playing, by the respective controlled-environment facility resident communication and/or media device, the notification over a set of wireless headphones dedicated for use with the respective controlled-environment facility resident communication and/or media device.

16. The method of claim 11, further comprising:

issuing, by the controlled-environment facility, a wirelessly transmitted notification to at least one set of wireless headphones disposed within the controlled-environment facility;

interrupting play of media on the respective set of wireless headphones; and playing, by the respective set of wireless headphones, the notification over the respective set of wireless headphones.

17. The method of claim 11, further comprising enabling the controlled-environment facility to configure the controlled-environment facility resident communication and/or media device and dedicated set of wireless headphones, remotely.

18. The method of claim 11, further comprising enabling the controlled-environment facility to monitor communication between the controlled-environment facility resident communication and/or media device and the dedicated set of wireless headphones, remotely.

19. The method of claim 11, further comprising:

detecting, by the controlled-environment facility resident communication and/or media device, short-range wireless signals not associated with the controlled-environment facility resident communication and/or media device and/or the dedicated set of wireless headphones; and alerting, by the controlled-environment facility resident communication and/or media device, the controlled-environment facility to a location of, and/or transmitting to the controlled-environment facility, the short-range wireless signals not associated with the controlled-environment facility resident communication and/or media device and/or the dedicated set of wireless headphones.

20. The method of claim 11, wherein the set of wireless headphones comprise a microphone.

21. A non-transitory computer-readable storage medium having program instructions stored thereon that, upon execution by a controlled-environment facility resident communication and/or media device disposed within a controlled-environment facility, cause the controlled-environment facility resident communication and/or media device to:

wirelessly communicatively link a set of wireless headphones with the controlled-environment facility resident communication and/or media device; and dedicate the set of wireless headphones to the controlled-environment facility resident communication and/or media device by restricting the set of wireless headphones to use with the controlled-environment facility resident communication and/or media device.

* * * * *